(12) United States Patent
Mori

(10) Patent No.: US 6,977,877 B2
(45) Date of Patent: Dec. 20, 2005

(54) COMPRESSED AUDIO DATA REPRODUCTION APPARATUS AND COMPRESSED AUDIO DATA REPRODUCING METHOD

(75) Inventor: Taro Mori, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 611 days.

(21) Appl. No.: 09/813,803

(22) Filed: Mar. 22, 2001

(65) Prior Publication Data

US 2001/0024568 A1 Sep. 27, 2001

(30) Foreign Application Priority Data

Mar. 23, 2000 (JP) .............................. 2000-081590

(51) Int. Cl.⁷ .............................................. G11B 5/09
(52) U.S. Cl. ................................. 369/47.24; 369/47.16
(58) Field of Search .......................... 369/47.15, 47.16, 369/47.19, 47.2, 47.22, 47.23, 47.24, 47.27, 369/47.46, 59.13, 59.21, 59.27

(56) References Cited

U.S. PATENT DOCUMENTS

| | | | |
|---|---|---|---|
| 5,748,835 A * | 5/1998 | Lee | 386/104 |
| 5,933,398 A * | 8/1999 | Fujinami | 369/47.16 |
| 5,987,417 A * | 11/1999 | Heo et al. | 369/59.21 |
| 6,108,633 A * | 8/2000 | Kolluru | 704/500 |
| 6,272,153 B1 * | 8/2001 | Huang et al. | 370/503 |
| 6,292,440 B1 * | 9/2001 | Lee | 369/7 |
| 6,360,204 B1 * | 3/2002 | Li et al. | 704/503 |
| 6,430,533 B1 * | 8/2002 | Kolluru et al. | 704/500 |
| 6,577,589 B1 * | 6/2003 | Sawabe et al. | 369/275.3 |
| 6,594,444 B2 * | 7/2003 | Lee | 386/108 |

FOREIGN PATENT DOCUMENTS

| | | |
|---|---|---|
| JP | 5-028647 | 2/1993 |
| JP | 11-317022 | 11/1999 |
| JP | 11-353799 | 12/1999 |

* cited by examiner

Primary Examiner—Paul W. Huber
(74) Attorney, Agent, or Firm—Oblon, Spivak, McClelland, Maier & Neustadt, P.C.

(57) ABSTRACT

An object of the present invention is to easily and quickly decode a plurality of types of compressed audio data. A compressed audio data reproduction apparatus comprising a plurality of decoders configured to decode compressed audio data of respective exclusive compression forms, a compression form identifying portion configured to identify the compression form based on header information of the compressed audio data, and a selector configured to select the decoders corresponding to the compression form identified by said compression form identifying portion from said plurality of decoders.

17 Claims, 4 Drawing Sheets

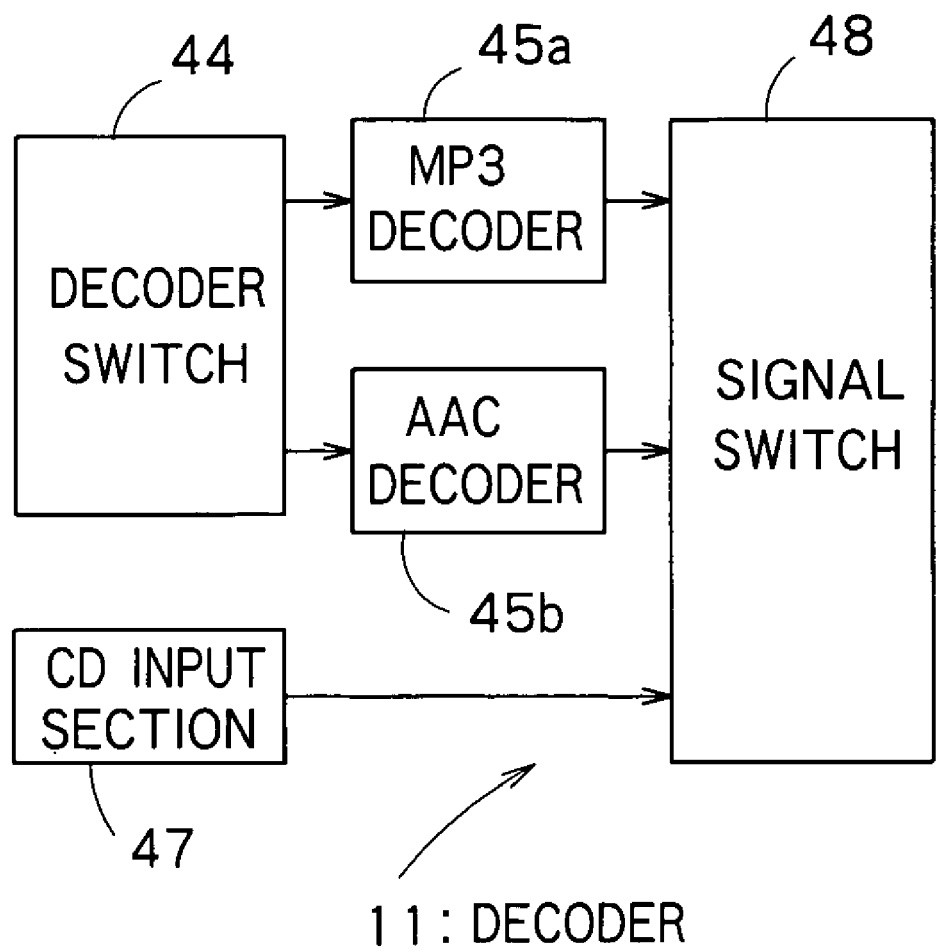
F I G. 3

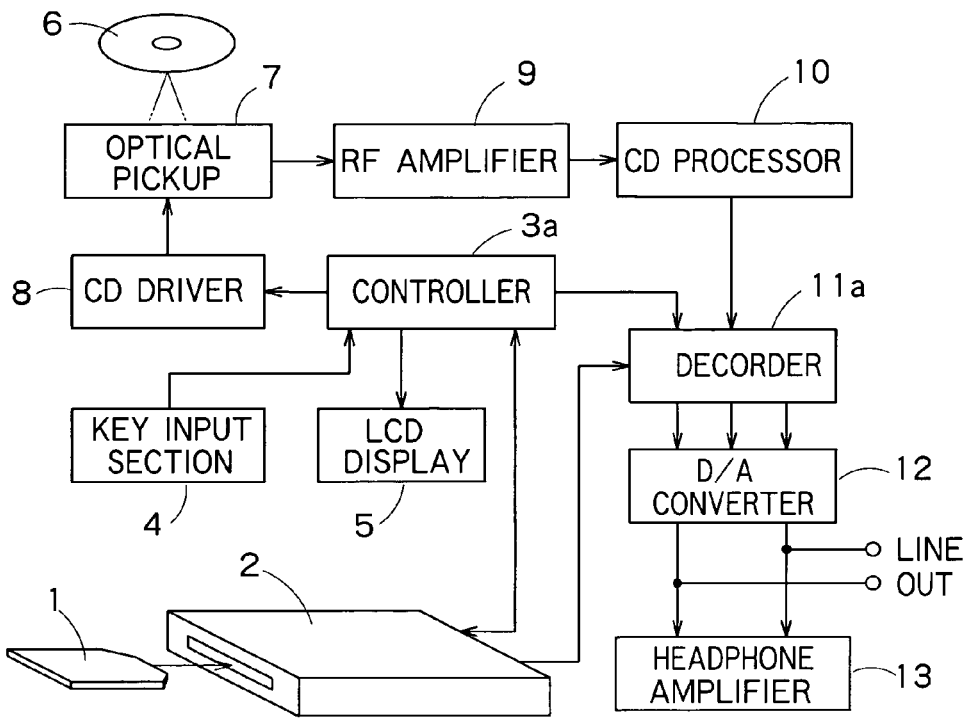
F I G. 4
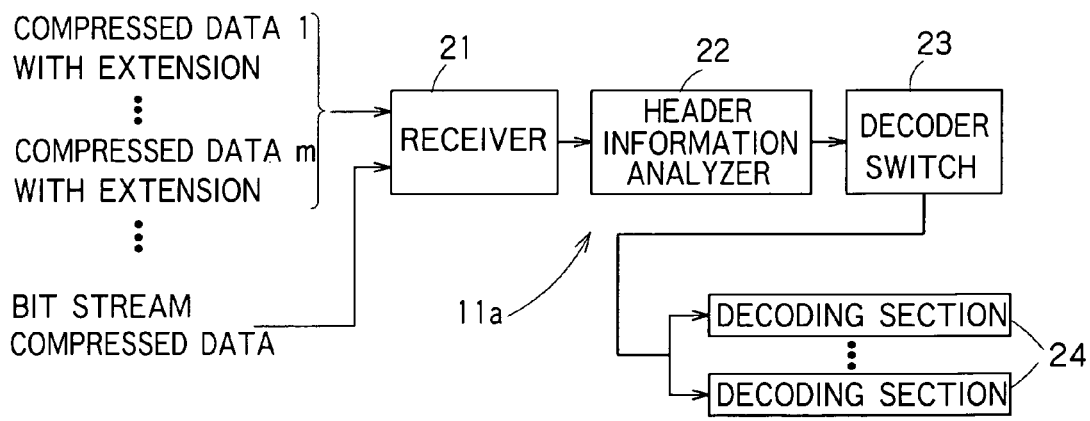
F I G. 5

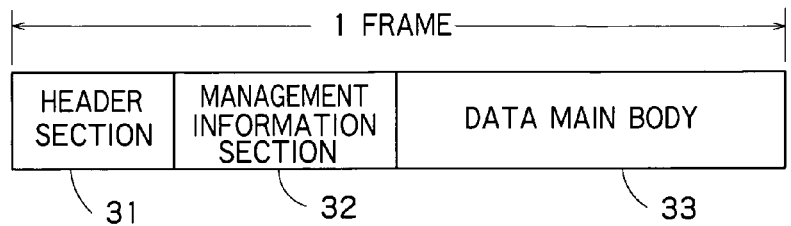

FIG. 6

CONTENTS OF HEADER

| USE | THE NUMBER OF BITS | DEFINITION |
|---|---|---|
| ID | 1 | 1:MPEG 1/Audio, 0:Reserved |
| LAYER | 2 | 11:LAYER I, 10:LAYER II, 01:LAYER III, 00:Reserved |
| PROTECTION BIT | 1 | 1:ERROR DETECTION INFORMATION NOT ADDED<br>0:THE SAME INFORMATION ADDED |
| BIT RATE | 4 | INDEX FOR DEFINING BIT RATE |
| SAMPLING FREQUENCY | 2 | 11:Reserved, 10:32kHz, 00:44.1kHz |
| PADDING BIT | 1 | 1:FRAME INCLUDING EXCESS SLOT<br>0:FRAME INCLUDING NO SLOT |
| USE BIT | 1 | UNUSED IN ISO/IEC |
| MODE | 2 | 00:STEREO, 01:JOINT STEREO<br>10:DUAL STEREO, 10:SINGLE STEREO |
| MODE EXTENSION | 2 | SUB BAND FOR JOINT STEREO IN LAYER I/II, COMBINATION OF USED INTENSITY STEREO AND MS STEREO FOR LAYER |
| COPYRIGHT | 1 | 1:COPYRIGHT PROTECTED, 0:NO COPYRIGHT |
| ORIGINAL/COPY DISTINCTION | 1 | 1:ORIGINAL, 0:COPY |
| EMPHASIS | 2 | TYPE OF EMPHASIS TO BE USED |

FIG. 7

COMPRESSED AUDIO DATA REPRODUCTION APPARATUS AND COMPRESSED AUDIO DATA REPRODUCING METHOD

CROSS REFERENCE TO RELATED APPLICATIONS

This application claims the priority right under 35 U.S.C. 119 of Japanese Patent Application No. 81590/2000 filed in Japan on Mar. 23, 2000.

BACKGROUND OF THE INVENTION

1. Field of the Invention

The present invention relates to a compressed audio data reproduction apparatus and a compressed audio data reproducing method for extending and reproducing compressed audio data, and more particularly, it relates to a technique for reproducing a plurality of types of compressed audio data with compressed form different from one another.

2. Related Background Art

In recent years, with technical advantage and cost reduction of a computer, it has become possible to easily record, reproduce and process audio data with the computer. An amount of the audio data presented in forms such as CD is enormous. Therefore, a large number of audio compression forms have been proposed in which it is possible to highly compress data, while holding the same sound quality as that of CD. Examples of the forms include MPEG1 LAYER3 (MP3) and MPEG2 AAC (AAC).

When the compressed audio data is reproduced with the computer, a conventional method identifies a file extension, and then executes an extension program for the extension, and then based on the result of the executed program, performs an extension processing of the compressed audio data.

FIG. 1 is a block diagram showing a schematic constitution of a conventional compressed audio data reproduction apparatus. The apparatus of FIG. 1 can perform reproduction of compressed audio data of MP3 and the like, and reproduction of CD.

The compressed audio data reproduction apparatus of FIG. 1 includes a data reader 2 for reading out compressed audio data stored in a portable recording medium 1 such as smart media, a controller 3 for controlling the entire system, a key input section 4 for selecting various functions, an LCD display 5 for displaying a music piece name and the like, an optical pickup 7 for reading information recorded in a CD 6, a CD driver 8 for controlling the optical pickup 7, an RF amplifier 9 for amplifying the information read by the optical pickup 7, a CD processor 10 for carrying out a signal processing for an output of the RF amplifier 9, a decoder 11 for decoding the compressed audio data or bit stream data from the CD, a D/A converter 12 for converting the decoded data to an analog sound signal, and a headphone amplifier 13 for outputting sound to a headphone.

FIG. 2 is a block diagram showing an internal constitution of the controller 3 and decoder 11 of FIG. 1. The controller 3 of FIG. 2 includes a receiver 41 for receiving the compressed audio data, a file manager 42 for associating the data with a file type or another file, and a file extension identifier 43 for identifying the type of the data based on the extension of the data taken by the receiver 41.

Here, the file manager 42 is realized by utilizing a function of a FAT management or a DOS.

On the other hand, the decoder 11 includes a decoder switch 44 for switching the decoder based on the extension identified by the file extension identifier, and a plurality of decoding sections 45 disposed for respective extensions.

FIG. 3 is a block diagram showing the internal constitution of the decoder 11 in more detail. The decoder 11 of FIG. 3 includes the aforementioned decoder switch 44, an MP3 decoder 45a for carrying out decoding (extension processing) of the compressed audio data with an MP3 form, an AAC decoder 45b for carrying out decoding of the compressed audio data with an AAC form, a CD input section 47 for extracting bit stream data from the CD processor 10, and a signal switch 48 for switching output signals from the MP3 decoder 45a, AAC decoder 45b and CD input section 47.

As described above, in the conventional method, since the FAT management or the file management function of the DOS is utilized to identify the type of the compressed audio data, there are problems that the internal constitution of the controller 3 shown in FIGS. 1 and 2 becomes complicated, and it also takes much time to reproduce the compressed audio data.

Moreover, the file manager 42 shown in FIG. 2 can identify the type of the compressed data having the extension, but cannot identify the type of bit stream compressed data of CD or the like. Therefore, in the conventional method, a decoding processing of the compressed data having the extension is carried out separately from a decoding processing of bit stream compressed data, and this causes a problem that the system constitution becomes complicated.

SUMMARY OF THE INVENTION

The present invention has been developed in consideration of this respect, and an object thereof is to provide a compressed audio data reproduction apparatus which can easily and quickly decode and reproduce a plurality of types of compressed audio data.

To achieve the object, there is provided a compressed audio data reproduction apparatus comprising:

a plurality of decoders configured to decode compressed audio data of respective exclusive compression forms;

a compression form identifying portion configured to identify the compression form based on header information of the compressed audio data; and a selector configured to select the decoders corresponding to the compression form identified by said compression form identifying portion from said plurality of decoders.

According to the present invention, since the header information of the compressed audio data is analyzed and the compression form is specified, optimum decoders can be selected for the compression form without utilizing a FAT management or a function of DOS. Therefore, the plurality of types of compressed audio data with compressed forms different from one another can easily and quickly be decoded and reproduced. Moreover, it is possible to carry out the decoding processing of the compressed audio data having the file extension such as MP3 in common with that of the bit stream compressed data such as CD. Therefore, the entire apparatus can be miniaturized, and a processing time required for reproduction can also be shortened.

BRIEF DESCRIPTION OF THE DRAWINGS

FIG. 3 is a block diagram showing the internal constitution of the decoder in more detail.

FIG. 4 is a block diagram showing a schematic constitution of an embodiment of a compressed audio data reproduction apparatus according to the present invention.

FIG. 5 is a block diagram showing an internal constitution of a decoder of FIG. 4.

FIG. 6 is a diagram showing a data constitution of compressed audio data.

FIG. 7 is a diagram showing breakdown of a header section.

DESCRIPTION OF THE PREFERRED EMBODIMENTS

A compressed audio data reproduction apparatus according to the present invention will concretely be described hereinafter with reference to the drawings.

Figure 1:
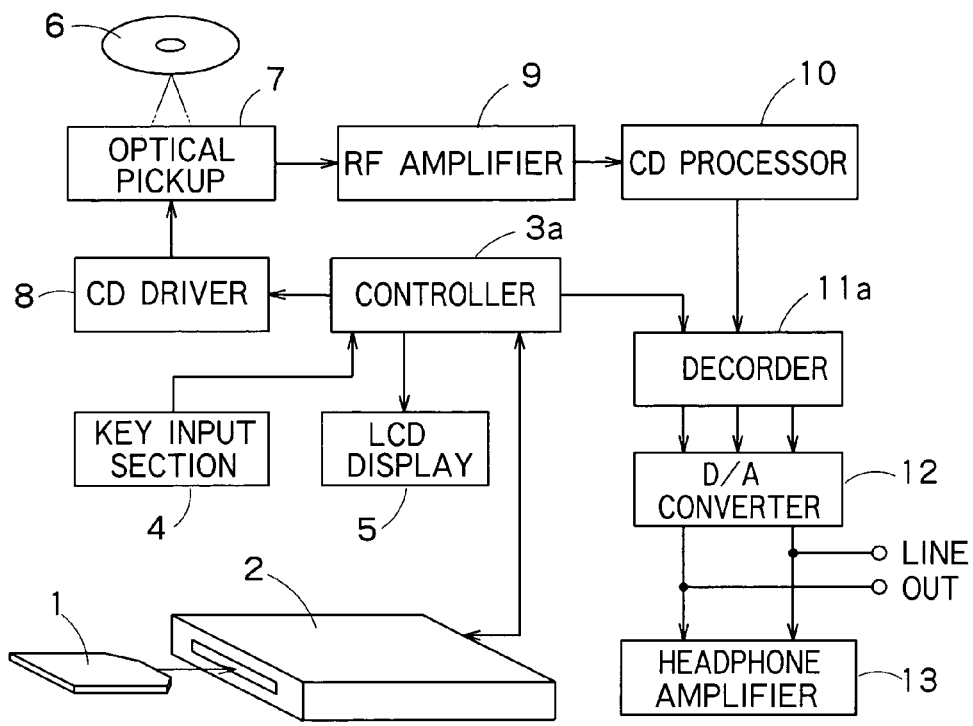
FIG. 1 is a block diagram showing a schematic constitution of a conventional compressed audio data reproduction apparatus.
Figure 2:
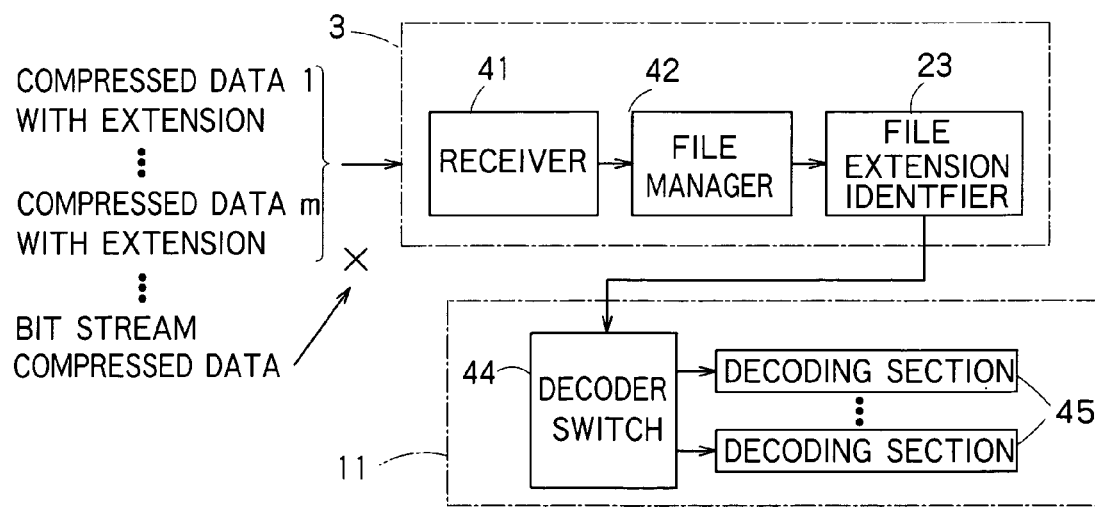
FIG. 2 is a block diagram showing an internal constitution of a controller and decoder of FIG. 1.

FIG. 4 is a block diagram showing a schematic constitution of an embodiment of the compressed audio data reproduction apparatus according to the present invention. In FIG. 4, constituting components common to those of FIG. 1 are denoted with the same reference numerals, and different respects will mainly be described hereinafter.

The compressed audio data reproduction apparatus of FIG. 4 includes a data reader 2 for reading out compressed audio data stored in a portable recording medium 1 such as smart media, a controller 3a for controlling the entire system, a key input section 4 for selecting various functions, an LCD display 5 for displaying a music piece name and the like, an optical pickup 7 for reading information recorded in a CD 6, a CD driver 8 for controlling the optical pickup 7, an RF amplifier 9 for amplifying the information read by the optical pickup 7, a CD processor 10 for performing a signal processing based on an output of the RF amplifier 9, a decoder 11a for decoding the compressed audio data or bit stream data from the CD, a D/A converter 12 for converting the decoded data to an analog sound signal, and a headphone amplifier 13 for outputting sound to a headphone.

In the compressed audio data reproduction apparatus of FIG. 4, the type of the compressed audio data can be identified and the data can be decoded regardless of the FAT management or control of the DOS. Concretely, internal constitutions of the controller 3a and decoder 11a are different from conventional constitutions.

FIG. 5 is a block diagram showing the internal constitution of the decoder 11a of FIG. 4. The decoder 11a of FIG. 5 includes a receiver 21 for taking the compressed audio data read via the data reader 2 and bit stream data from the CD 6, a header information analyzer (compression form identifying portion) 22 for analyzing header information of the taken data, a decoder switch (selector) 23 for switching a decoding processing based on a header analysis result, and a plurality of decoding sections 24 corresponding to respective exclusive compression forms.

FIG. 6 is a diagram showing a data constitution of the compressed audio data. As shown in FIG. 6, the compressed audio data is constituted of a plurality of frames (packets), and each frame includes a header section 31 in which data type and other information are stored, a management information section 32 in which bit allotment information and the like are stored, and a data main body 33.

FIG. 7 is a diagram showing breakdown of the header section 31. As shown in FIG. 7, information such as ID, layer, protection bit, bit rate, and sampling frequency are stored in the header section 31.

For example, in case of MP3, since the ID is "1" and the layer is "3", "1" is stored in the ID of the header section 31, and "01" is stored in the layer. Moreover, in case of AAC, "1" is stored in the ID of the header section 31, and "00" is stored in the layer. Therefore, when the ID and layer of the header section 31 are detected, MP3 and AAC can be identified.

Operation of the compressed audio data reproduction apparatus of FIG. 4 will next be described. When the reproduction of the compressed audio data is instructed via the key input section 4, the data reader 2 reads the compressed audio data stored in the portable recording medium 1 and transmits the data to the decoder 11a.

The decoder 11a analyzes the header section 31 of the compressed audio data and identifies the compression form. As described above, the MP3 and AAC can be identified by the ID and layer of the header section 31. Moreover, even when the data is compressed in other compression forms (e.g., ATRAC3, TWIN-VQ, WMA and the like), the information indicating the compression form is stored in the header section 31. Therefore, the compression form can be specified by detecting the information. Additionally, depending upon a compression form, a frame constitution of FIG. 6 is sometimes different from that of FIG. 7. Even in this case, the compression form can be specified by forming the frame constitution inherent in each compression form in a database.

When the compression form is identified, the decoder 11a selects the decoding section 24 for the compression form and performs the decoding (extension processing) of the compressed audio data.

On the other hand, in case of reproducing the CD 6, similarly as the conventional method, the CD processor 10 generates the bit stream data based on bit information read by the optical pickup 7.

Similarly as the compressed audio data, the bit stream data is inputted to the receiver 21. In case of the bit stream data, since the header information does not exist, the predetermined decoder 11a is selected, and the extension processing is performed.

After the data subjected to the extension processing is converted to the analog sound signal by the D/A converter 12, sound is outputted via the headphone amplifier 13.

Thus, in the present embodiment, since the header information of the compressed audio data is analyzed and the compression form is identified, different from the conventional method, the compression form can be identified without utilizing the file management function of DOS or the like, and the constitution of the controller 3a can be simplified. Moreover, since the compressed audio data having the extension and the bit stream data from the CD or the like can similarly be processed, the constitution of the decoder 11a can also be simplified. Therefore, the system can be miniaturized, a burden of an operating system (hereinafter referred to as OS) is reduced, and time required for the reproduction of the compressed audio data can therefore be shortened.

In the aforementioned embodiment, MP3 or AAC has been described as one example of the compressed audio data, but the type of the compressed audio data to be reproduced is not particularly limited. That is, all types of compressed audio data having the information on the compression form in the header section 31 can be an object of the present invention.

Moreover, in the aforementioned embodiment, the example for utilizing the smart media as one example of the portable recording medium 1 has been described, but the concrete type and form of the portable recording medium 1 are not particularly limited.

Moreover, the example in which the reproduction of the compressed audio data and the reproduction of the CD are possible has been described with reference to FIG. 4, but the CD reproduction function may be omitted.

What is claimed is:

1. A compressed audio data reproduction apparatus comprising:
    a plurality of decoders configured to decode compressed audio data of respective exclusive compression forms;
    a compression form identifying portion configured to identify the compression form based on header information of the compressed audio data; and
    a selector configured to select the decoders corresponding to the compression form identified by said compression form identifying portion from said plurality of decoders;
    wherein the compressed audio data includes compressed data having an extension by which a file type is identified, and bit stream compressed data typified by a compact disk (CD), and
    said compression form identifying portion identifies the compression form for said compressed data having the extension based on the header information, and selects a predetermined compression form for said bit stream compressed data.

2. A compressed audio data reproduction apparatus comprising:
    a plurality of decoders configured to decode compressed audio data of respective exclusive compression forms;
    a compression form identifying portion configured to identify the compression form based on header information of the compressed audio data; and
    a selector configured to select the decoders corresponding to the compression form identified by said compression form identifying portion from said plurality of decoders;
    wherein said header section includes at least ID information indicating whether or not the audio data is of a moving picture experts group (MPEG) standard, and layer information indicating a layer, and
    said compression form identifying portion identifies at least MPEG-1 audio layer 3 (MP3) data and adaptive audio coding (AAC) data based on said ID information and said layer information.

3. A compressed audio data reproduction apparatus comprising:
    a plurality of decoders configured to decode compressed audio data of respective exclusive compression forms;
    a compression form identifying portion configured to identify the compression form based on header information of the compressed audio data; and
    a selector configured to select the decoders corresponding to the compression form identified by said compression form identifying portion from said plurality of decoders;
    wherein said compression form identifying portion stores a frame constitution inherent in each of different compression forms in a database, and searches for the database to identify the compression form.

4. A compressed audio data reproduction apparatus comprising:
    a plurality of decoders configured to decode compressed audio data of respective exclusive compression forms;
    a compression form identifying portion configured to identify the compression form based on header information of the compressed audio data; and
    a selector configured to select the decoders corresponding to the compression form identified by said compression form identifying portion from said plurality of decoders;
    wherein said compression form identifying portion identifies the compression form without utilizing a file management function of an operating system.

5. The compressed audio data reproduction apparatus according to claim 4, wherein the compressed audio data includes compressed data having an extension by which a file type is identified, and bit stream compressed data identified by a compact disk (CD), and
    said compression form identifying portion identifies the compression form for said compressed data having the extension based on the header information, and selects a predetermined compression form for said bit stream compressed data.

6. The compressed audio data reproduction apparatus according to claim 4, wherein said header section includes at least ID information indicating whether or not the audio data is of a moving picture experts group (MPEG) standard, and layer information indicating a layer, and
    said compression form identifying portion identifies at least MPEG-1 audio layer 3 (MP3) data and adaptive audio coding (AAC) data based on said ID information and said layer information.

7. The compressed audio data reproduction apparatus according to claim 4, wherein said compression form identifying portion stores a frame constitution inherent in each of different compression forms in a database, and searches for the database to identify the compression form.

8. The compressed audio data reproduction apparatus according to claim 4, further comprising:
    a compressed data reading portion configured to read the compressed audio data from a recording medium in which the compressed audio data is recorded; and
    a D/A converter configured to convert the data decoded by said decoders selected by said selector to an analog signal,
    said plurality of decoders, said compression form identifying portion, said selector, said reading portion, and said D/A converter being contained in the same housing.

9. The compressed audio data reproduction apparatus according to claim 4, further comprising:
    a CD reading portion configured to read bit stream data recorded in a CD,
    said CD reading portion being disposed in a housing separate from a housing in which said plurality of decoders, said compression form identifying portion, said selector, said reading portion, and said D/A converter are contained.

10. A compressed audio data reproduction apparatus comprising:
    a plurality of decoders configured to decode compressed audio data of respective exclusive compression forms;
    a compression form identifying portion configured to identify the compression form based on header information of the compressed audio data;

a selector configured to select the decoders corresponding to the compression form identified by said compression form identifying portion from said plurality of decoders; and a CD reading portion configured to read bit stream data recorded in a CD, said CD reading portion being disposed in a housing separate from a housing in which said plurality of decoders, said compression form identifying portion, said selector, said reading portion, and said D/A converter are contained.

11. A compressed audio data reproducing method for decoding and reproducing compressed audio data of a plurality of compression forms with decoders exclusive for the respective compression forms, said compressed audio data reproducing method comprising steps of:

identifying the compression form based on header information of said compressed audio data; and selecting said decoders corresponding to the identified compression form;

wherein the compressed audio data includes compressed data having an extension by which a file type is identified, and bit stream compressed data typified by a compact disk (CD), and said step of identifying the compression form identifies the compression form for said compressed data having the extension based on the header information, and selects the predetermined compression form for said bit stream compressed data.

12. A compressed audio data reproducing method for decoding and reproducing compressed audio data of a plurality of compression forms with decoders exclusive for the respective compression forms, said compressed audio data reproducing method comprising steps of:

identifying the compression form based on header information of said compressed audio data; and selecting said decoders corresponding to the identified compression form;

wherein said header section includes at least ID information indicating whether or not the audio data is of a moving picture experts group (MPEG) standard, and layer information indicating a layer, and said step of identifying the compression form identifies at least MPEG-1 audio layer 3 (MP3) data and adaptive audio coding (AAC) data based on said ID information and said layer information.

13. A compressed audio data reproducing method for decoding and reproducing compressed audio data of a plurality of compression forms with decoders exclusive for the respective compression forms, said compressed audio data reproducing method comprising steps of:

identifying the compression form based on header information of said compressed audio data; and selecting said decoders corresponding to the identified compression form;

wherein said step of identifying the compression form stores a frame constitution inherent in each of different compression forms in a database, and searches for the database to identify the compression form.

14. A compressed audio data reproducing method for decoding and reproducing compressed audio data of a plurality of compression forms with decoders exclusive for the respective compression forms, said compressed audio data reproducing method comprising steps of:

identifying the compression form used on header information of said compressed audio data; and selecting said decoders corresponding to the identified compression form;

wherein said step of identifying the compression form identifies the compression form without utilizing a file management function of an operating system.

15. The compressed audio data reproducing method according to claim 14, wherein the compressed audio data includes compressed data having an extension by which a file type is identified, and bit stream compressed data typified by a compact disk (CD), and said step of identifying the compression form identifies the compression form for said compressed data having the extension based on the header information, and selects the predetermined compression form for said bit stream compressed data.

16. The compressed audio data reproducing method according to claim 14, wherein said header section includes at least ID information indicating whether or not the audio data is of a moving picture experts group (MPEG) standard, and layer information indicating a layer, and said step of identifying the compression form identifies at least MPEG-1 audio layer 3 (MP3) data and adaptive audio coding (AAC) data based on said ID information and said layer information.

17. The compressed audio data reproducing method according to claim 14, wherein said step of identifying the compression form stores a frame constitution inherent in each of different compression forms in a database, and searches for the database to identify the compression form.

* * * * *